(12) United States Patent
Houser et al.

(10) Patent No.: US 9,683,378 B2
(45) Date of Patent: Jun. 20, 2017

(54) MOUNTING BRACKET

(71) Applicant: Yale Security Inc., Monroe, NC (US)

(72) Inventors: Blue Houser, Edgemoor, SC (US); Tommy G. McNally, II, Indian Trail, NC (US)

(73) Assignee: Yale Security Inc., Monroe, NC (US)

( * ) Notice: Subject to any disclaimer, the term of this patent is extended or adjusted under 35 U.S.C. 154(b) by 0 days.

(21) Appl. No.: 14/831,380

(22) Filed: Aug. 20, 2015

(65) Prior Publication Data

US 2015/0354230 A1    Dec. 10, 2015

Related U.S. Application Data (62) Division of application No. 13/242,727, filed on Sep. 23, 2011, now Pat. No. 9,115,526.

(51) Int. Cl.
| | |
|---|---|
| *E04F 21/00* | (2006.01) |
| *G01C 9/34* | (2006.01) |
| *G01C 9/26* | (2006.01) |
| *B25B 11/00* | (2006.01) |
| *E05F 3/22* | (2006.01) |

(52) U.S. Cl.
CPC .......... *E04F 21/0007* (2013.01); *B25B 11/00* (2013.01); *E05F 3/227* (2013.01); *G01C 9/34* (2013.01); *E05Y 2600/56* (2013.01); *E05Y 2900/132* (2013.01); *G01C 9/26* (2013.01); *Y10T 29/4978* (2015.01)

(58) Field of Classification Search
CPC ... A47B 96/027; A47B 96/028; A47B 96/061; G01C 9/26; G01C 9/34; B25B 11/00; E05F 3/327; E04F 21/0007; Y10T 29/49778

USPC ............ 248/544, 475.1, 222.14, 224.8, 904; 33/370, 371, 372, 379, 381, 382, 369; 49/506

See application file for complete search history.

(56) References Cited

U.S. PATENT DOCUMENTS

| | | | |
|---|---|---|---|
| 1,200,410 A | * | 10/1916 | Chemrinsky ............ G01C 9/28 33/370 |
| 2,636,282 A | | 4/1953 | Kronquist |

(Continued)

FOREIGN PATENT DOCUMENTS

GB      2248035 A     3/1992

OTHER PUBLICATIONS

Yale Security Inc., Canadian Application No. 2,787,792, Office Action, Feb. 28, 2014.

(Continued)

*Primary Examiner* — Tan Le
(74) *Attorney, Agent, or Firm* — Michael G. Johnston; Moore & Van Allen PLLC (57) ABSTRACT

A bracket is provided for use in installing door hardware on a support surface. The bracket comprises a rigid member having a longitudinal axis, a front surface, a substantially planar rear surface for engaging the support surface, and a peripheral edge extending between and joining the front and rear surfaces. A spirit bubble level is disposed on the rigid member such that the rigid member can be oriented relative to a horizontal line or a vertical line, the level having the bubble centered only when the level is horizontal or vertical. At least a portion of the peripheral edge of the rigid member provides a mounting surface for the door hardware when the rigid member is secured to the support surface.

4 Claims, 8 Drawing Sheets

(56) References Cited

U.S. PATENT DOCUMENTS

| | | | |
|---|---|---|---|
| 3,268,944 A | 8/1966 | Sanchez | |
| 3,449,789 A | 6/1969 | Russell et al. | |
| 3,859,002 A | 1/1975 | Sauey | |
| 4,218,829 A | 8/1980 | Wightman | |
| 4,635,414 A | 1/1987 | Allen | |
| 5,303,895 A * | 4/1994 | Hart | A47G 1/168 248/475.1 |
| 6,186,708 B1 | 2/2001 | Fridman | |
| 6,209,214 B1 | 4/2001 | Talavera | |
| 6,434,848 B1 | 8/2002 | Gordon et al. | |
| 6,640,456 B2 | 11/2003 | Owoc et al. | |
| 6,874,739 B1 | 4/2005 | Gregory | |
| 7,059,059 B1 * | 6/2006 | Ames | G01C 9/28 33/372 |
| 7,484,333 B2 | 2/2009 | Houser et al. | |
| 7,708,252 B2 * | 5/2010 | Vander Berg | A47B 96/027 248/475.1 |
| 8,115,526 B2 * | 2/2012 | Shiobara | H03L 7/183 327/147 |
| D659,513 S * | 5/2012 | Lin | D8/349 |
| 8,390,219 B2 | 3/2013 | Houser | |
| 2007/0164080 A1 | 7/2007 | Young | |
| 2013/0075558 A1 | 3/2013 | Houser et al. | |
| 2015/0354230 A1 * | 12/2015 | Houser | E05F 3/227 49/506 |

OTHER PUBLICATIONS

Yale Security Inc., Canadian Application No. 2,787,792, Office Action, Feb. 24, 2015.

* cited by examiner

MOUNTING BRACKET

CROSS REFERENCES

This application is a divisional application of U.S. patent application Ser. No. 13/242,727, filed Sep. 23, 2011, now U.S. Pat. No. 9,115,526, the contents of which are incorporated herein by reference.

BACKGROUND

A mounting bracket is described and, more particularly, a mounting bracket for installing door hardware, such as a door operator, and ensuring that the door hardware is properly positioned.

Mounting brackets are known for mounting objects, such as shelves, picture frames, mirrors, and the like, to a wall, door or other support structure. When mounting an object, one or more factors such as the positioning, orientation, etc., of the object are typically evaluated to determine a desirable or acceptable location. Conventional mounting systems may incorporate alignment mechanisms. For example, it is sometimes important that the mounted object is level, which may be desirable for aesthetics as well as the proper functioning of the object. It is known to integrate a spirit or bubble type level with a mounting bracket for facilitating level mounting of the bracket to a structure. However, the size of the level, or the size of the components integral with the bracket for holding the level, may result in having to provide additional space to accommodate the level or the other components.

Door hardware is mounted on or adjacent to a door or in a door frame, and, in the case of a door operator, effects movement of the door relative to the frame between a closed position and an open position. A typical door operator includes an electric motor and a linkage assembly for operatively coupling the drive shaft of the motor to the door so that the door will be opened and closed when the drive shaft rotates. The door may be closed under power or with a door closer. A conventional door closer uses an internal spring mechanism which is compressed during the opening of the door for storing sufficient energy so that the door can be returned to the closed position without the input of additional electrical energy.

A door operator typically includes a substantially flat rectilinear back plate. When installing the door operator, the back plate is initially secured to the upper edge of the door using mounting bolts or other fasteners such that the back plate extends generally horizontally. In some applications, the back plate is mounted directly to the door frame, to the wall adjacent the door frame, or concealed within the wall or door frame. The components of the door operator such as, for example, the motor, the door closer, and the like, are fixed directly or indirectly to the back plate.

Templates are sometimes provided to permit a user when installing a back plate to mark the position of fastener holes to be made in the support structure. For a door operator mounted to a door, the template is positioned on the door and aligned with an edge of the door. Indicia on the template indicate where holes are to be drilled. Unfortunately, conventional templates provide no means for ensuring that the back plate will be horizontal. Other tools are necessary to level the template, although many installers merely eyeball the orientation of the template. Consequently, relatively elaborate drill jigs are available along with the templates to aid in installing door operators. Moreover, the back plate itself is a substantial component, usually made of heavy gauge metal for providing the necessary structural support for the door operator, making the back plate difficult to manipulate during installation. As a result, the installation of the door operator often is a time consuming process that can require numerous adjustments or remounting of the hardware.

For the foregoing reasons there is a need for a new mounting bracket. The mounting bracket should be useful for mounting door hardware, such as a door operator. Ideally the mounting bracket will function to aid a user in installing the door operator in a proper position and, if desired, a level or plumb orientation.

SUMMARY

A bracket is provided for use in installing door hardware on a support surface. The bracket comprises a rigid member having a longitudinal axis, a front surface, a substantially planar rear surface for engaging the support surface, and a peripheral edge extending between and joining the front and rear surfaces. A spirit bubble level is disposed on the rigid member such that the rigid member can be oriented relative to a horizontal line or a vertical line, the level having the bubble centered only when the level is horizontal or vertical. At least a portion of the peripheral edge of the rigid member provides a mounting surface for the door hardware when the rigid member is secured to the support surface.

A combination is provided comprising a door hardware member including a base member, and a bracket for use in installing the door hardware member on a support surface. The bracket comprises a rigid member having a longitudinal axis, a front surface, a substantially planar rear surface for engaging the support surface, and a peripheral edge extending between and joining the front and rear surfaces. A spirit bubble level is disposed on the rigid member such that the rigid member can be oriented relative to a horizontal line or a vertical line, the level having the bubble centered only when the level is horizontal or vertical. At least a portion of the peripheral edge of the rigid member provides a mounting surface for engaging the base member when the rigid member is secured to the support surface, and wherein the base member is mounted properly relative to the horizontal or vertical line.

A method is also provided for installing door hardware to a surface. The installation method comprises the steps of providing a bracket, the bracket including a rigid member having a longitudinal axis, a front surface, a substantially planar rear surface for engaging the support surface, and a peripheral edge extending between and joining the front and rear surfaces, and a spirit bubble level disposed on the rigid member. The rigid member is positioned on the surface relative to a horizontal line or a vertical line, the level having the bubble centered only when the level is horizontal or vertical, and the bracket is secured to the surface. A door hardware member is provided, including a base member. The base member is positioned against the surface in contiguous relation with the bracket, wherein at least a portion of the edge of the rigid member provides a mounting surface for the base member when the rigid member is secured to the support surface, and the base member is secured to the surface.

BRIEF DESCRIPTION OF THE DRAWINGS

For a more complete understanding of a mounting bracket as described herein, reference should now be had to the embodiments shown in the accompanying drawings and described below. In the drawings.

DESCRIPTION

Certain terminology is used herein for convenience only and is not to be taken as a limitation on the invention. For example, words such as "upper," "lower," "left," "right," "horizontal," "vertical," "upward," and "downward" merely describe the configuration shown in the FIGS. Indeed, the components may be oriented in any direction and the terminology, therefore, should be understood as encompassing such variations unless specified otherwise.

Figure 1:
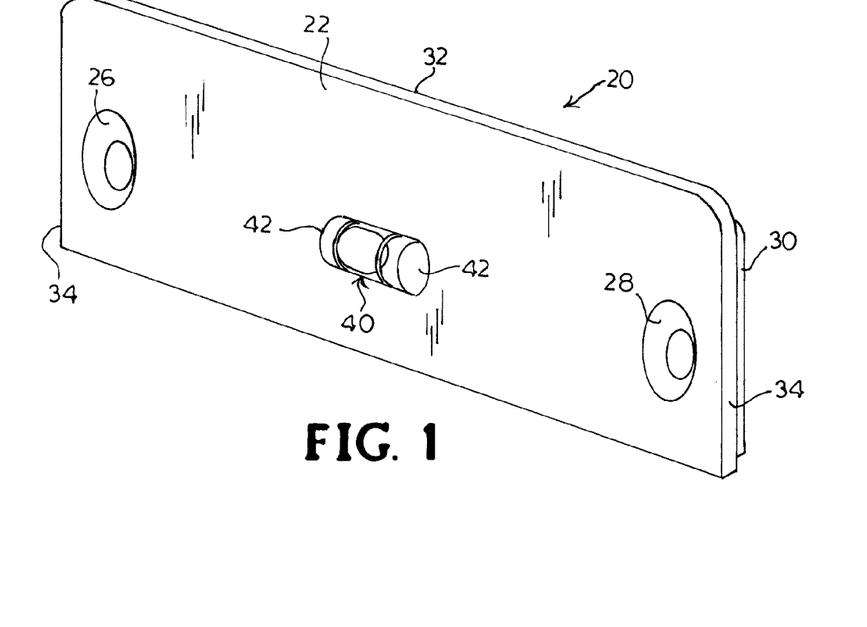
FIG. 1 is a front perspective view of an embodiment of a bracket for use in mounting door hardware to a support structure.
Figure 2:
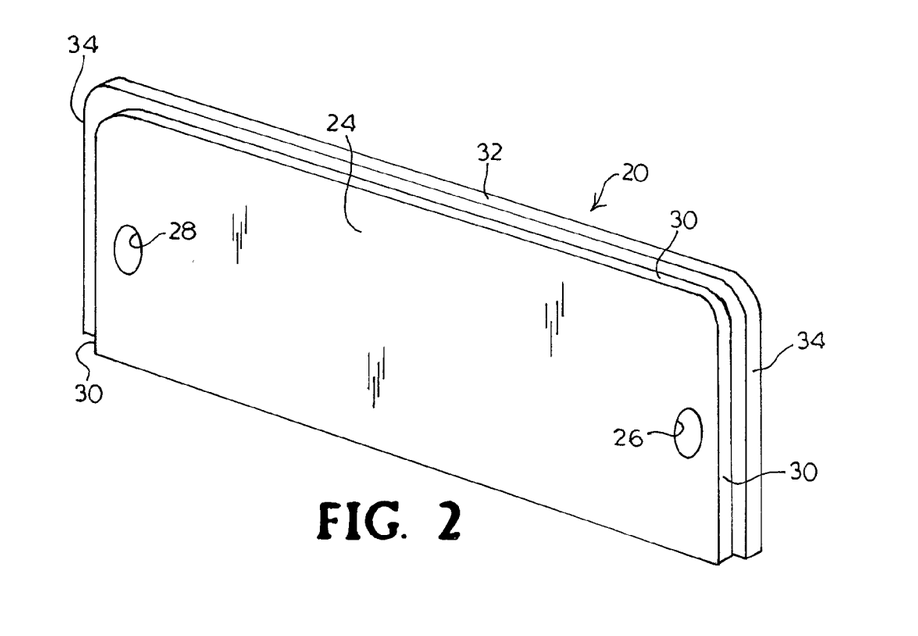
FIG. 2 is a rear perspective view of the bracket as shown in FIG. 1.

Referring now to the drawings, wherein like reference numerals designate corresponding or similar elements throughout the several views, an embodiment of a mounting bracket for door hardware is shown in FIGS. 1 and 2 and is generally designated at 20. The bracket 20 is a substantially planar plate member, including a front major surface 22, an opposed rear major surface 24, and a peripheral top edge 32 and a bottom edge 33 joined by side edges 34. The bracket 20 has a first opening 26 and a second opening 28 adjacent the respective side edges 34 of the bracket 20. In the embodiment shown, the first and second openings 26, 28 are generally circular holes for receiving fasteners. The first and second openings 26, 28 may be provided in a countersunk configuration so that an end of a fastener, such as a nail or a screw, is flush with the front surface 22 of the bracket 20 when mounted. The rear surface 24 (FIG. 2) of the bracket 20 is configured for engaging with the surface of the support structure, which is generally flat. A continuous shoulder 30 is formed along the top edge 32 and the side edges 34 of the bracket 20.

The embodiments of the bracket 20, 80 described herein are preferably formed from metal, such as steel or aluminum, as a one-piece unitary member. The bracket 20 may also be injection molded from a plastic material, such as polycarbonate, although other conventional thermoplastic or thermoset resins could be used. Other types of materials may also be used to construct the bracket 20 including, for example, rubber, composite materials, or combinations thereof. In one embodiment, the material will allow the bracket 20 to be transparent. It is understood that the scope of the invention is not intended to be limited by the materials listed here, but may be carried out using any material which allows the construction and operation of the mounting bracket 20 described herein.

A level 40 is mounted on the front surface 22 of the bracket 20 such that the level 40 is in view of a user installing the bracket. The level 40 may be a conventional level, for example, a spirit or bubble level, as shown, for insuring that the bracket 20 is level from end-to-end when installed. The level 40 may be permanently or removably secured to the bracket 20. For example, the level 40 may be attached by an epoxy adhesive to the front surface 22 of the bracket 20. In the embodiment shown, opposed housings 42 integral with the bracket 20 protrude from the front surface 22 of the bracket 20 for securing the level 40 in place. The mounting bracket 20 is configured such that a portion of the level 40 and housings extend beyond the planar front surface 22 of the bracket. In another embodiment, the level may be embedded in the bracket 20.

It is understood that, although the mounting bracket 20 will be described in detail herein with reference to the exemplary embodiment of a bracket for mounting of door hardware, the mounting bracket may be applied to, and find utility in, mounting of other objects to a support structure. As described above, mounting brackets are used in a wide variety of applications involving other objects such as, for example, shelves, mirrors, picture frames, fixtures, sconces and the like, on different support structures, such as doors, walls, moveable panels, etc., and the like. Further, although the mounting bracket will be described in detail herein as embodied in a door operator, wherein the bracket locates and supports a back plate, it is not intended to be so limited. The mounting bracket may be used in other door hardware, such as door closers, exit devices, and the like. Thus, the mounting bracket has general applicability to any object mounted to a support structure, wherein improvements in efficiency of installation are desired.

Figure 3:
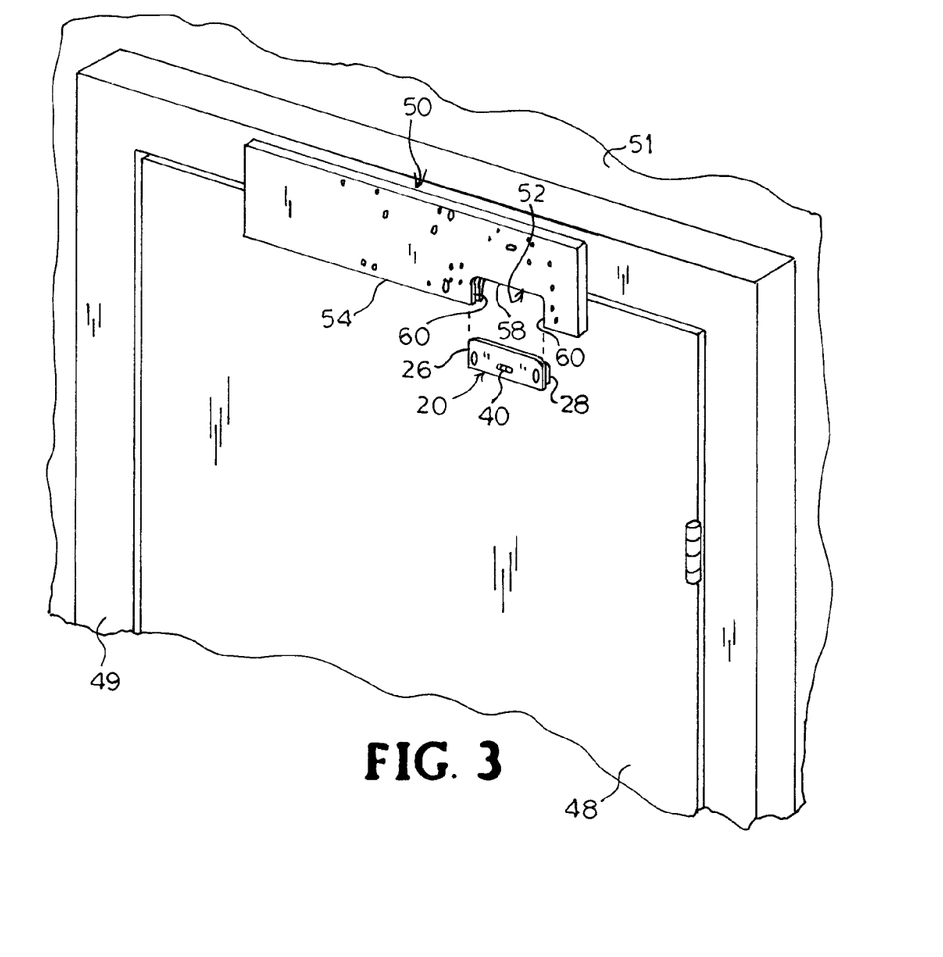
FIG. 3 is a partially exploded perspective view of the bracket as shown in FIG. 1 secured to a door and an embodiment of a back plate for mounting to the door.
Figure 4:
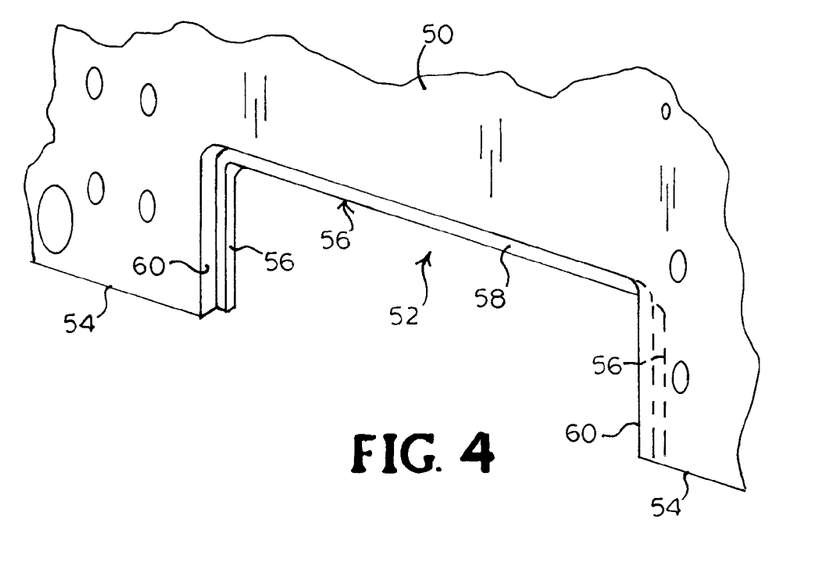
FIG. 4 is a close-up perspective view of an opening in the back plate for receiving the bracket as shown in FIG. 1.

Referring to FIG. 3, the mounting bracket 20 is shown in place on a door 48 in a door frame 49, along with a back plate 50 for mounting door hardware. The door 48 is a left-hand swinging door shown in a fully closed position. It is understood that the mounting bracket 20 may be used with a right-hand door since only reversal of some of the components adapts the bracket to a right-hand door. The bracket 20 is located a desired distance from a top edge and a hinged edge of the door 48. The proper location of the bracket 20 may vary depending on the door hardware to be mounted. As seen in FIG. 3, the back plate 50 is a substantially planar elongated plate member which, as shown, is conventional other than a generally rectangular recess 52 formed in the lower edge 54 of the back plate 50 for receiving the bracket 20. Referring to FIG. 4, an inwardly extending lip 56 is formed along the top edge 58 and side edges 60 of the recess 52. The size and shape of the recess 52 are configured to correspond to the size and shape of the periphery of the bracket 20. The complementary shape relationship provides support, as well as a "self-aligning" or "self-centering" function when the back plate 50 is engaged with the mounting bracket 20.

In use, the mounting bracket 20 is held in a preferred position on the door 48 with one hand and oriented until the bubble in the tube of the level 40 indicates that the bracket 20 is level. In one embodiment, the rear surface 24 of the mounting bracket 20 may be provided with adhesive, such as double-sided tape, to keep the bracket 20 from slipping on the door while in place. When the level 40 is horizontal, the other hand of the user traces or scribes the shape of the bracket 20 and the first and second openings 26, 28 onto the door 48 with, for example, a pen, pencil or other marking device. In one embodiment, the housings 42 protrude from the front surface 22 of the bracket 20 by a distance sufficient to permit the user to grip the bracket 20, such as between a thumb and a forefinger of one hand, for positioning the bracket 20 on the door 48 while tracing the outline of the bracket 20 and the openings 26, 28. Once marks are made on the door 48, the bracket 20 may be removed and holes drilled for inserting fasteners. The mounting bracket 20 is then attached to the door using, for example, screws attached to the door 48 through the first and second openings 26, 28 and tightened to secure the bracket 20 to the door 48.

Figure 5:
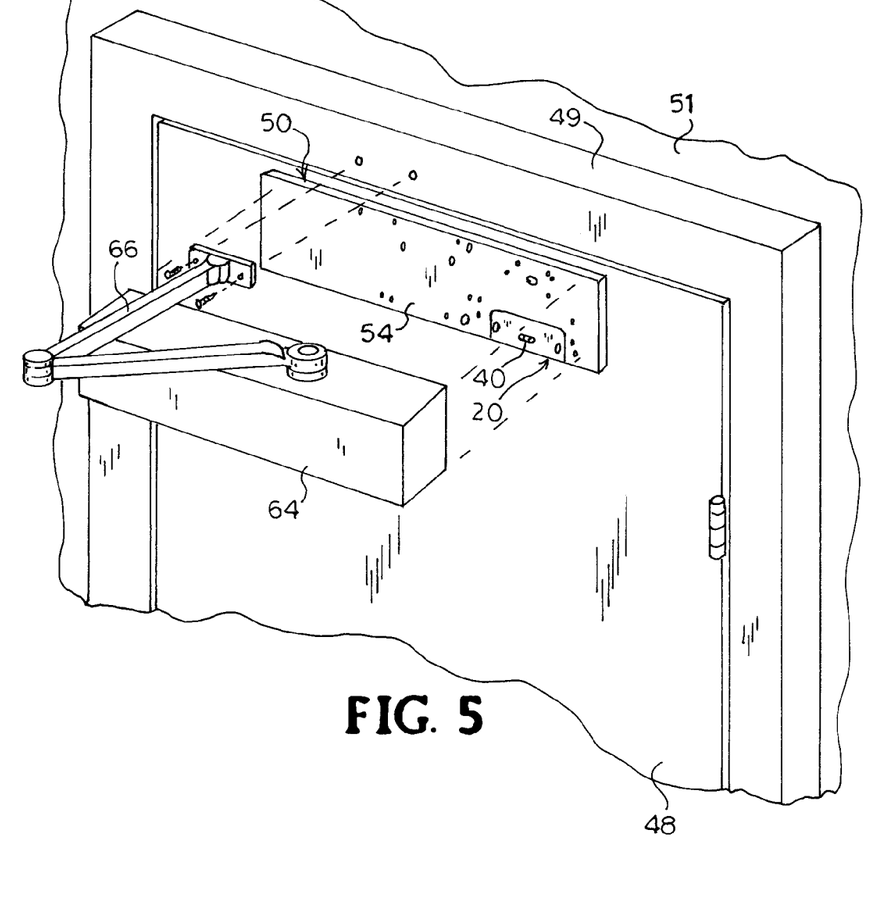
FIG. 5 is a partially exploded perspective view of the bracket and back plate as shown in FIG. 3 and an embodiment of a door operator for mounting to the back plate.
Figure 6:
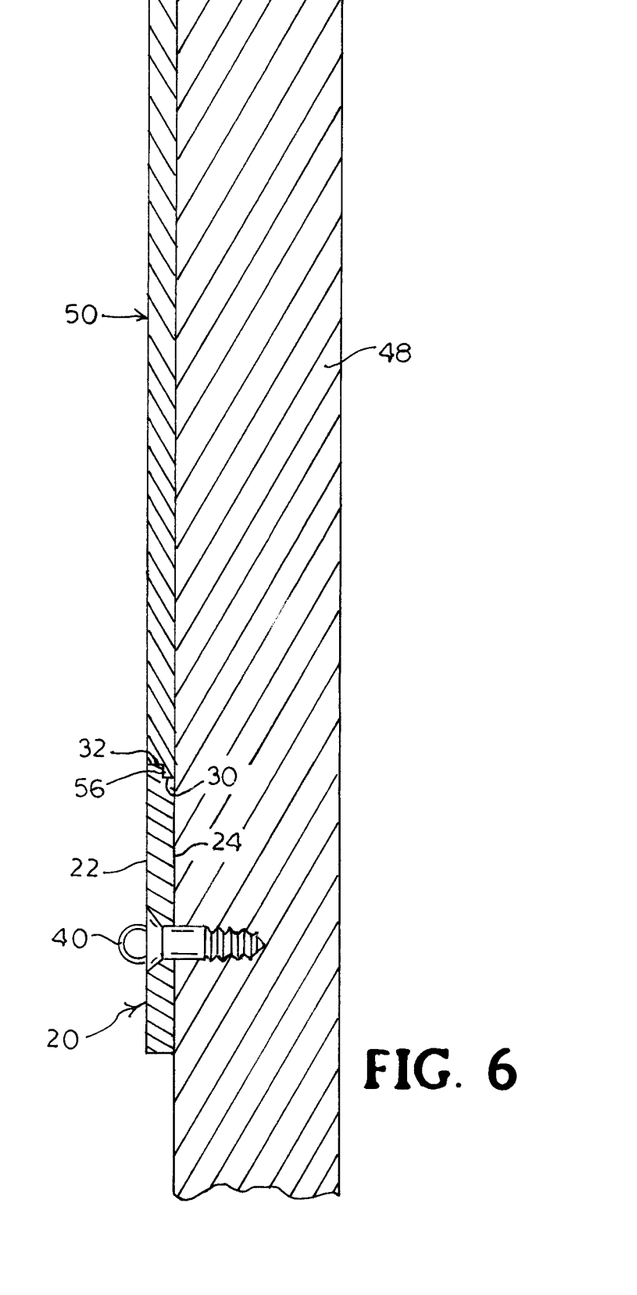
FIG. 6 is a side elevation cross-section view of the bracket and the back plate mounted on a door taken along line 6-6 of FIG. 5.

The back plate 50 is then placed against the door 48 and positioned on and supported by the bracket 20 (FIG. 5). Referring to FIG. 6, with the mounting bracket 20 secured in a level orientation to the door 48, the rear surface 24, the shoulder, the top edge and the side edges of the bracket 20 and the door 48 define a slot for receiving the lip 56 on the back plate 50. As the back plate 50 is slid down onto the bracket 20, the bracket 20 is received in the recess 52 in the back plate 50 (FIG. 5) and the lip 56 on the back plate 50 is received between the bracket 20 and the door 48 (FIG. 4) such that the lip sits on the shoulder 30 and the back plate 50 seats flush against the door 48. Because the mounting bracket 20 is mounted level, the back plate 50 will extend generally horizontally on the door 48 surface. The back plate 50 is securely mounted to the door 48 using fasteners, such as screws or bolts.

As shown in FIG. 5, the remaining hardware of the door operator is then secured to the back plate. Only a cover 64 and a linkage assembly 66 for operably coupling the door operator to the door are shown. The cover 64 serves to surround and enclose the components of the door operator to reduce dirt and dust contamination, and to provide a more aesthetically pleasing appearance. It is understood that the door hardware internal to the cover 64 may comprise, for example, a motor assembly, a door closer assembly, a controller, and the like. Although the mounting bracket 20 and the back plate 50 are shown mounted directly to the door 48, they could be mounted to the door frame 49 or to the wall adjacent the door frame, or concealed within the wall or door frame. Concealed door operators are well known in the art of automatic door operators.

Figure 7:
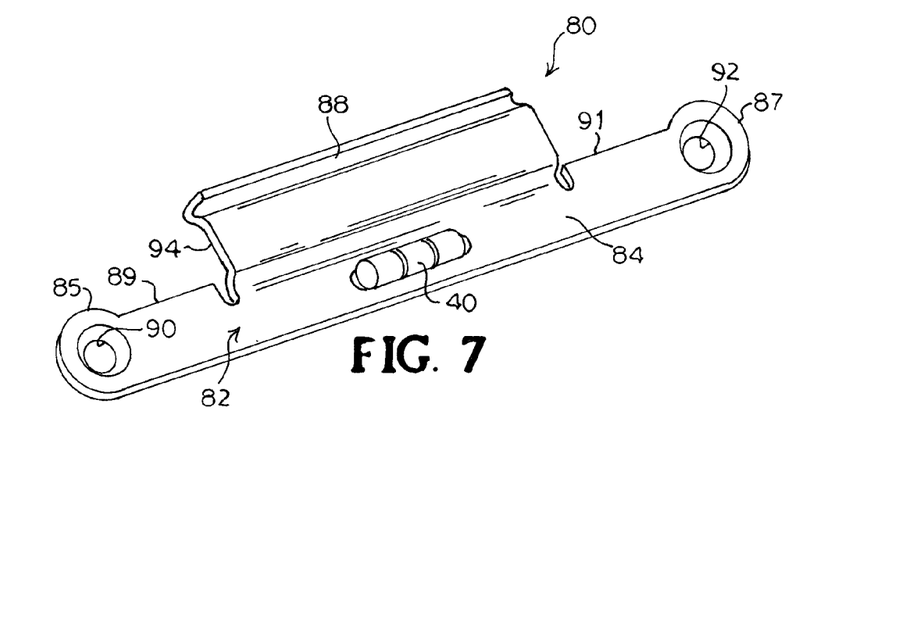
FIG. 7 is a perspective view of another embodiment of a bracket for use in mounting door hardware to a support structure.
Figure 8:
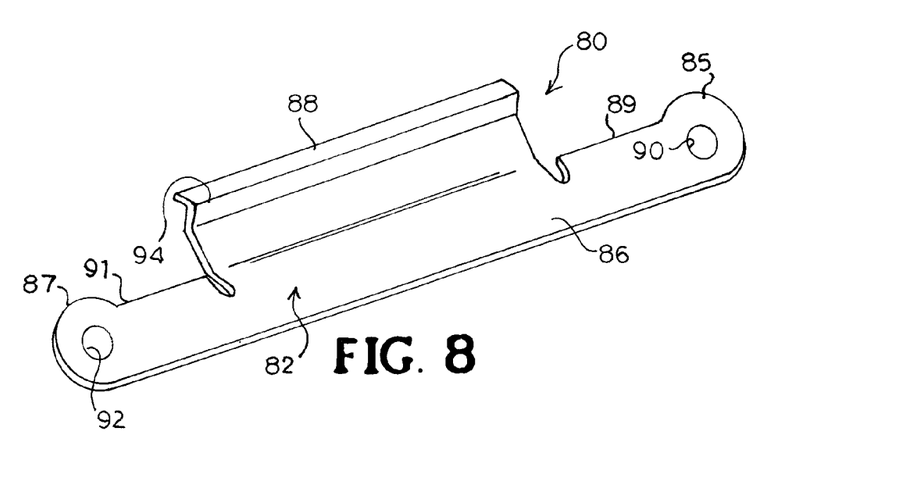
FIG. 8 is a rear perspective view of the bracket as shown in FIG. 7.

A second embodiment of a mounting bracket for door hardware is shown in FIGS. 7 and 8 and generally designated at 80. The bracket 80 of this embodiment comprises a substantially planar elongated portion 82, including a front major surface 84 and an opposed rear major surface 86, and peripheral top edges 89, 91. The planar portion 82 of the bracket 80 terminates in a first ear 85 and a second ear 87 adjacent the respective ends of the bracket 80. The ears 85, 87 define a first opening 90 and a second opening 92 for receiving fasteners. As in the first embodiment described herein, the first and second openings 90, 92 may be provided in a countersunk configuration so that a fastener, such that an end of a nail or a screw, is flush with the front surface 84 of the bracket 80 when mounted. A flange 88 extends upwardly from along the peripheral top edge of the planar portion 82 of the bracket 80 intermediate of the ears 85, 87. The flange 88 is generally "S"-shaped in transverse cross-section, extending from a planar leg extending angularly outwardly a first distance and terminating in a longitudinal edge. The flange 88 is integral with the longitudinal edge of the leg, and includes a planar first portion extending upwardly from the leg and terminating in a longitudinal edge, the first portion of the flange and the leg defining a rear longitudinal channel 94, a planar second portion extending angularly rearwardly a second distance from the longitudinal edge of the first portion and terminating in a longitudinal edge, the first distance being greater than the second distance, and a planar third portion extending angularly outwardly from the longitudinal edge of the second portion of the flange. The level 40 (FIG. 7) is mounted on the front surface 84 of the planar portion 82 of the bracket 80, as in the first embodiment. The rear surface 86 (FIG. 8) of the planar portion 82 of the bracket 80 is configured for engaging with the surface of the support structure.

Figure 9:
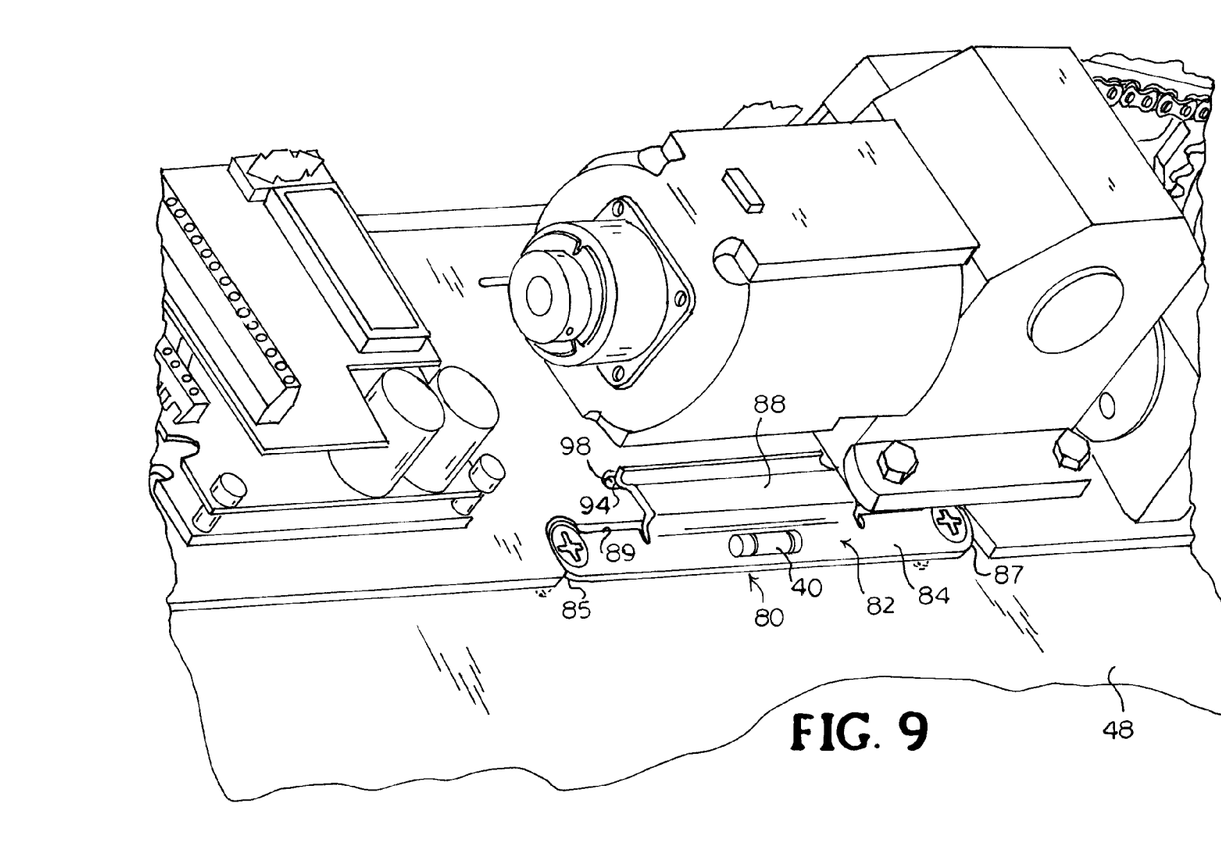
FIG. 9 is a cut-off perspective view of the bracket as shown in FIG. 7 and an embodiment of a door operator including a back plate secured to a door.
Figure 10:
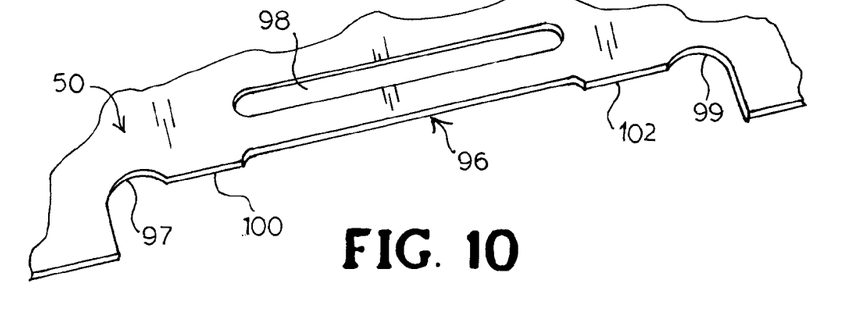
FIG. 10 is a close-up perspective view of an opening in the back plate for receiving the bracket as shown in FIG. 7.

Referring to FIG. 9, the mounting bracket 80 and door hardware are shown in place on a support structure, such as a door 48. The mounting bracket 80 is secured to the door in a level orientation to the door as described above using, for example, screws attached to the door 48 through the first and second openings 90, 92 and tightened to secure the bracket 80 to the door 48. As shown in FIG. 10, the back plate 50 defines a generally rectangular recess 96 formed in the lower edge 54 of the back plate 50 for receiving the bracket 80. The shape and size of the corners of the recess 96 are configured to correspond to the periphery of the ears 85, 87 and a first planar portion extending inwardly from the ears along the top edge of the bracket 80. The back plate 50 also has a longitudinal slot 98 spaced from the recess 96 for receiving the upper end of the flange 88. The complementary shaped relationship of the recess 96 to the ends of the bracket 80 provides a "self-aligning" or "self-centering" function when the back plate 50 is engaged with the mounting bracket 80.

Figure 11:
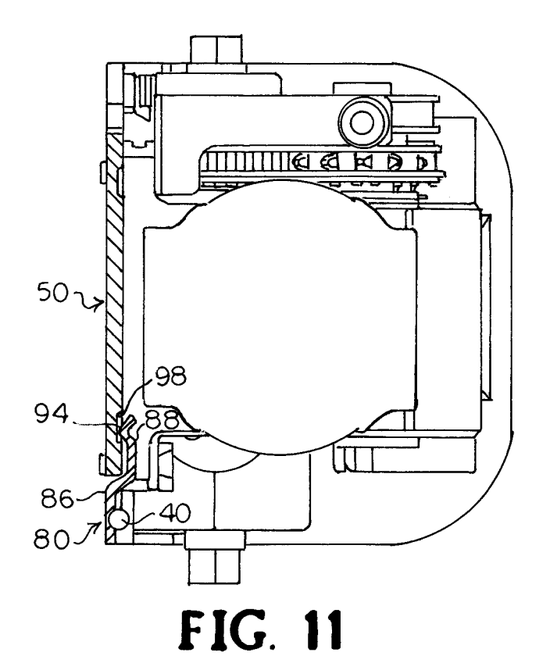
FIG. 11 is a side elevation cross-section view of the bracket and the door operator taken along line 11-11 of FIG. 9.

Referring to FIGS. 9 and 11, the upper end of the flange 88 is shown in the slot 98 in the back plate 50. A portion of the back plate below the slot is disposed in the channel 94 behind the flange 88. The flange 88 may be resiliently movable with respect to the planar part of the bracket 80 such that contact with the back plate 50 may forcibly flex the flange 88 outwardly during installation. The upper edge of the bracket 80 defines recesses adjacent the flange 88 for providing relative flexibility of the bracket 80 and the flange 88. In use, the flange 88 "snaps" into place in the slot 98 when the back plate 50 is in the proper position relative to the bracket 80. In this position, because the mounting bracket 80 may be mounted level, the back plate 50 and door hardware will extend generally horizontally on the door 48 surface.

It is understood that a plurality of levels may be disposed on the bracket for orienting the bracket during installation. In one embodiment, two spirit bubble levels are provided and positioned such that they mutually perpendicular. Accordingly, the bracket may be oriented such that one level is horizontal or and the other level is vertical when the respective bubbles are centered.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. For example, the mounting bracket may be used to mount objects other than door hardware to support structure other than a door or door frame. Accordingly, we intend to cover all such modifications, omission, additions and equivalents as may be included within the spirit and scope of the invention as defined by the following claims. In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

We claim:

1. A bracket for use in installing door hardware on a support surface, the bracket comprising:
    a rigid member having a longitudinal axis, a front outer surface, a substantially planar rear inner surface for engaging the support surface, and a peripheral edge extending between and joining the front outer and rear inner surfaces, at least a portion of the peripheral edge of the rigid member providing a mounting surface for the door hardware when the rigid member is secured to the support surface;
    a spirit bubble level disposed on the rigid member such that the rigid member can be oriented relative to a horizontal line or a vertical line, the level having the bubble centered only when the level is horizontal or vertical; and
    a retaining tab for providing a mounting surface, the retaining tab comprising
        a planar leg extending angularly outwardly a first distance from a portion of a length of an upper longitudinal peripheral edge of the rigid member, the planar leg terminating in a longitudinal edge, and
        a flange integral with the longitudinal edge of the leg, the flange including
            a planar first portion extending upwardly from the leg and terminating in a longitudinal edge, the first portion of the flange and the leg defining an open longitudinal channel,
            a planar second portion extending angularly rearwardly a second distance from the longitudinal edge of the first portion and terminating in a longitudinal edge, the first distance being greater than the second distance, and
            a planar third portion extending angularly outwardly from the longitudinal edge of the second portion of the flange.

2. A bracket as recited in claim 1, wherein the peripheral edge of the rigid member has recesses adjacent the retaining tab.

3. In combination:
    a door hardware member including a base member; and
    a bracket for use in installing the door hardware member on a support surface, the bracket comprising
        a rigid member having a longitudinal axis, a front surface, a substantially planar rear surface for engaging the support surface, and a peripheral edge extending between and joining the front and rear surfaces, at least a portion of the peripheral edge of the rigid member providing a mounting surface for engaging the base member when the rigid member is secured to the support surface,
        a spirit bubble level disposed on the rigid member such that the rigid member can be oriented relative to a horizontal line or a vertical line, the level having the bubble centered only when the level is horizontal or vertical, wherein the base member is mounted properly relative to the horizontal or vertical line, and
        a retaining tab comprising
            a planar leg extending angularly outwardly a first distance from a length of an upper longitudinal peripheral edge of the rigid member and terminating in a longitudinal edge; and
            a flange integral with the longitudinal edge of the leg, the flange including
                a planar first portion extending upwardly from the leg and terminating in a longitudinal edge, the first portion of the flange and the leg defining an open longitudinal channel,
                a planar second portion extending angularly rearwardly a second distance from the longitudinal edge of the first portion and terminating in a longitudinal edge, the first distance being greater than the second distance, and
                a planar third portion extending angularly outwardly from the longitudinal edge of the second portion of the flange,
    wherein the base member defines a slot for receiving the longitudinal edge of the second portion of the flange.

4. A method for installing door hardware onto a surface, the installation method comprising the steps of:
    providing a bracket, the bracket including a rigid member having a longitudinal axis, a front surface, a substantially planar rear surface for engaging the support surface, a peripheral edge extending between and joining the front and rear surfaces, and a retaining tab for providing a mounting surface, the retaining tab comprising
        a planar leg extending angularly outwardly a first distance from a portion of a length of an upper longitudinal peripheral edge of the rigid member, the planar leg terminating in a longitudinal edge, and
        a flange integral with the longitudinal edge of the leg, the flange including
            a planar first portion extending upwardly from the leg and terminating in a longitudinal edge, the first portion of the flange and the leg defining an open longitudinal channel,
            a planar second portion extending angularly rearwardly a second distance from the longitudinal edge of the first portion and terminating in a longitudinal edge, the first distance being greater than the second distance, and
            a planar third portion extending angularly outwardly from the longitudinal edge of the second portion of the flange,
        and a spirit bubble level disposed on the rigid member;
    positioning the rigid member on the surface relative to a horizontal line or a vertical line, the level having the bubble centered only when the level is horizontal or vertical;
    securing the bracket to the surface;
    providing a door hardware member, including a base member;
    positioning the base member against the surface in contiguous relation with the bracket, the base member defining a slot for receiving the retaining tab and inserting the retaining tab into the slot, wherein at least a portion of the edge of the rigid member provides a mounting surface for the base member when the rigid member is secured to the support surface; and
    securing the base member to the surface.

* * * * *